United States Patent [19]
Watson

[11] Patent Number: 4,856,557
[45] Date of Patent: Aug. 15, 1989

[54] SLIDING METAL SEAL VALVE MECHANISM

[75] Inventor: Richard R. Watson, Missouri City, Tex.

[73] Assignee: Gilmore Valve Company, Houston, Tex.

[21] Appl. No.: 325,537

[22] Filed: Mar. 20, 1989

[51] Int. Cl.$^4$ .............................................. F16K 3/18
[52] U.S. Cl. .................................. 137/625.25; 251/175
[58] Field of Search ............. 251/175, 193, 190, 195; 137/625.25

[56] References Cited

U.S. PATENT DOCUMENTS

| | | | |
|---|---|---|---|
| 3,215,163 | 11/1965 | Henderson | 251/175 X |
| 3,329,168 | 7/1967 | Vollmer | 251/175 X |
| 3,370,611 | 2/1968 | Flint | 251/175 X |
| 3,642,020 | 2/1972 | Payne | 251/175 X |
| 3,917,220 | 11/1975 | Gilmore | 251/175 X |
| 4,493,335 | 1/1985 | Watson | 137/625.65 X |

*Primary Examiner*—Alan Cohan
*Attorney, Agent, or Firm*—James L. Jackson

[57] ABSTRACT

A high pressure, low friction slide valve incorporates a valve body defining parallel spaced internal sealing surfaces and inlet, vent and function ports communicating with an internal valve chamber. A seal carrier is movable within the valve chamber and supports a seal cylinder for rockable motion therein. The seal cylinder has sealing contact with one of the sealing surfaces while a seal rod projecting from a transverse passage of the seal cylinder has sealing contact with the opposite sealing surface. Within the seal rod is positioned a packing member which is of a configuration establishing sealing within the seal cylinder only at a location immediately adjacent the inner end of the seal rod, thus permitting the seal cylinder and seal rod to have low friction metal-to-metal sealing engagement with the parallel sealing surfaces without necessitating the provision of close tolerance seals or O-rings and thus permitting efficient high pressure sealing and low friction movement of the valve mechanism.

20 Claims, 1 Drawing Sheet

SLIDING METAL SEAL VALVE MECHANISM

FIELD OF THE INVENTION

This invention relates generally to valves and more particularly to shear or gate type valves for hydraulic systems especially in electrically powered applications such as in deep petroleum wells where the valves are located at a significant distance from the power source and the electrical power for valve operation is subject to considerable line loss. More specifically, the present invention is related to a low friction shear valve with sliding metal seals which incorporates a low friction sealing system enabling it to be efficently operated under high pressure conditions by relatively low levels of electrical energy.

BACKGROUND OF THE INVENTION

Valves having sliding metal seals are well known for their resistance to contamination induced leakage. The shearing action of the hard metal seal edges of slide valves excludes fluid born contamination and accomplishes efficient sealing under circumstances which would interfere with the sealing capabilities of poppet valves and thereby allow leakage to occur.

A major disadvantage of valve mechanisms having sliding metal seals is the large frictional forces to which the valve mechanism is ordinarily subjected. The seals of poppet valves may be pressure balanced so that the valve operator (i.e., solenoid, spring, or pilot piston), has very low forces to overcome when shifting the position of the valve member. Large frictional forces cause larger power consumption of the valve actuator and also cause greater hysteresis to occur.

Solenoid energized valve mechanisms are typically employed for subsea control of oil and gas wells. The solenoids of solenoid valve mechanisms are energized by electrical energy transmitted through long power cables that extend from a surface based power source to the location of the valves. Typically, these long power cables have limited electrical transmission capacity because the size of the electrical conductors is limited and the length of these power cables subjects the electrical power to considerable line loss. Since subsea solenoid valves for well control are inaccessible from the standpoint of service, high reliability (i.e. contamination resistance) is of considerable importance.

Principally, the key to reducing the frictional forces to which a sliding seal valve is subjected, and hence the disadvantages of sliding metal seals is the reduction of the area of the sliding seals that is exposed to pressure. A point of diminishing practicality is soon reached with the traditional methods of reducing the pressure responsive area of valves of this particular type. A narrower contact surface seal reduces the pressure responsive area, but only at the risk of reduced structural integrity and reduced flow path dimension. A smaller diameter seal reduces the pressure responsive area but encounters additional difficulties because of the very small manufacturing and alignment tolerances that are presented.

The present invention has as its principal object, the provision of a novel sliding seal mechanism for valves which provides order of magnitude frictional force reduction as compared to conventional sliding seal type valve assemblies, while maintaining adequate seal contact surface dimension and while also providing simplicity of manufacture and alignment.

It is an even further feature of this invention to provide a novel seal arrangement for sliding seal type valve mechanism which includes a "rockable" mounting of the sliding seal assembly to insure that the sealing surface always maintains precision alignment and sealing capability as the sliding seal mechanism is reciprocated within the valve chamber of the valve.

It is also a feature of this invention to eliminate the need for conventional O-ring packings and to insure that the small seal diameter is sealed by means of an internal plug shaped elastomer seal packing that eliminates the need for close tolerance glands.

SUMMARY OF THE INVENTION

A sliding metal seal type shear valve constructed in accordance with the present invention includes a valve body forming an internal valve chamber and having three ports, i.e. a "supply" port, a "vent" port and a "function" port, each being in communication with the valve chamber. The supply port is adapted to be connected to a source of fluid under pressure, e.g. hydrostatic fluid such as hydraulic oil or water. The vent port is located opposite and out of registry with the supply port and is provided for venting fluid pressure from the body of the valve and thus venting fluid pressure from the function system controlled by the valve. The function port conducts the hydraulic fluid from the supply port when the sliding seal assembly is in its supply position to thus enable the pressure of the hydraulic fluid to act upon other equipment and thereby perform a desired activity. When the sliding seal assembly has been shifted to its vent position sufficient hydrostatic fluid is vented from the valve chamber such that the controlling function of the valve is reversed.

The valve body construction is such that a pair of seal plates including a "supply" seal plate and a "vent" seal plate are positioned in opposed relation and define a portion of the wall structure of the valve chamber therebetween. The seal plates each define planar sealing surfaces that are disposed in parallel spaced relation. A seal carrier is provided for the valve mechanism and includes a portion that is positioned between the planar sealing surfaces of the seal plates and which defines a radially inwardly extending circular flange forming a circular opening of restricted width. A seal cylinder having an axial length less than the spacig of the planar surfaces is positioned such that an intermediate portion thereof is received in "rockable" relation within the circular opening. This feature provides the seal cylinder with the capability of rocking about its longitudinal axis and seeking optimum sealing engagement with the spaced sealing surfaces. One end of the seal cylinder is disposed in sealing contact with the supply seal plate. The seal cylinder defines a transversely oriented axial passage forming a packing chamber and which also serves as a receptacle for a seal rod which establishes sealing engagement with the sealing surface of the vent seal plate. An elastomer packing is positioned within the packing chamber and is of such configuration that it establishes a seal within the packing chamber only in the vicinity of the inner end of the seal rod. The unsealed end of the packing member is separated from the supply by a circular seal plug which is also received within the packing chamber and functions as a retainer for the packing. The sealing end of the seal cylinder is defined by an axial projection which forms a circular sealing area of limited dimension but which is of sufficiently large diameter to encompass the supply port.

This sealing surface of restricted area functions efficiently to minimize the frictional forces to which the valve mechanism is subjected. The limited circular surface area defined by the sealing end of the seal rod also minimizes the frictional forces of the valve mechanism. The elastomeric seal packing effects a circular seal within the axial passage of the seal cylinder and at the inner end of the seal rod and thereby prevents the necessity for utilizing O-rings to establish seals between the seal cylinder and seal carrier or between the seal cylinder and the seal rod. These features in concert, restrict the magnitude of the frictional forces to which the valve mechanism is subjected even under high pressure conditions. Even without the usual close tolerance packing glands often utilized by this type of valve mechanism, effective sealing is accomplished while frictional forces are efficiently minimized.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the Drawings

FIG. 1 is a sectional view of a sliding seal type valve mechanism that is constructed in accordance with the features of this invention.

FIG. 2 is a fragmentary sectional view of the central portion of the valve mechanism of FIG. 1, illustrating the sealing mechanism of the valve in detail.

FIG. 3 is a sectional view of the valve mechanism of FIGS. 1 and 2 with its section taken along line 3—3 of FIG. 1 and showing the location of the function port.

DETAILED DESCRIPTION OF PREFERRED EMBODIMENT

Figure 1:
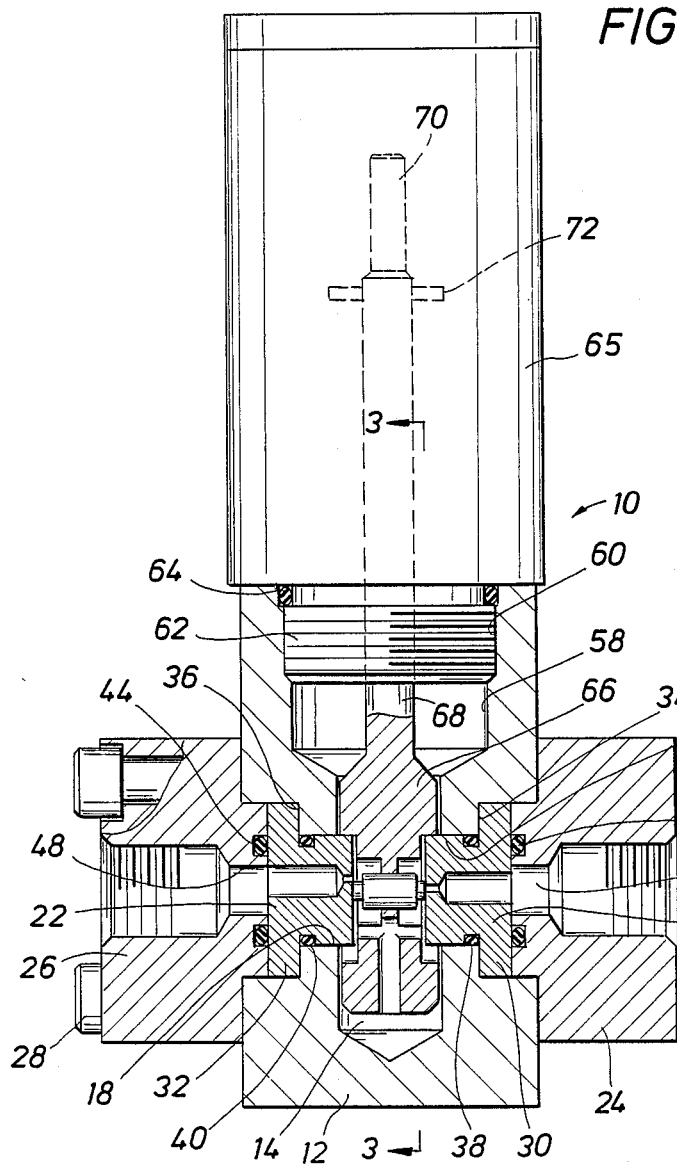

Referring now to the drawings and first to FIG. 1, a sliding seal type valve mechanism is illustrated generally at 10 which includes a valve body 12 forming a valve chamber 14 and having opposed, aligned body openings 16 and 18 which form seal plate receptacles. A "supply" seal plate 20 and a "vent" sea plate 22 are positioned within the respective seal plate receptacles 16 and 18 and are retained in place by seal plate retainer elements 24 and 26 respectively. The seal plate retainers are in turn secured to the body structure 12 by means of a plurality of bolts 28 or by any other suitable means of attachment. The seal plates 20 and 22 each form positioning flanges 30 and 32 respectively which are secured in seated relation against positioning shoulders 34 and 36 defined by the body structure. The seal plates are also maintained in sealed relation with respect to the body by means of sealing elements 38 and 40 which are retained within respective seal grooves formed in the seal plates. The seal plates are also sealed with respect to the retainer elements 24 and 26 by means of circular sealing elements 42 and 44. These sealing elements are positioned to encompass and seal supply and vent passages 46 and 48 that extend through the retainer elements 24 and 26 and through the seal plates 20 and 22. As shown in greater detail in FIG. 2 the supply and vent passages 46 and 48 terminate interiorly of the valve mechanism by means of a "supply" port 50 and a "vent" port 52. The supply and vent ports are of very small dimension, typically being in the order of 0.032 inches in diameter and terminate at respective planar sealing surfaces 54 and 56 which are formed by the respective seal plates. The planar sealing surfaces 54 and 56 are disposed in opposed parallel relation and form respective parts of the wall structure forming the valve chamber 14.

Figure 3:
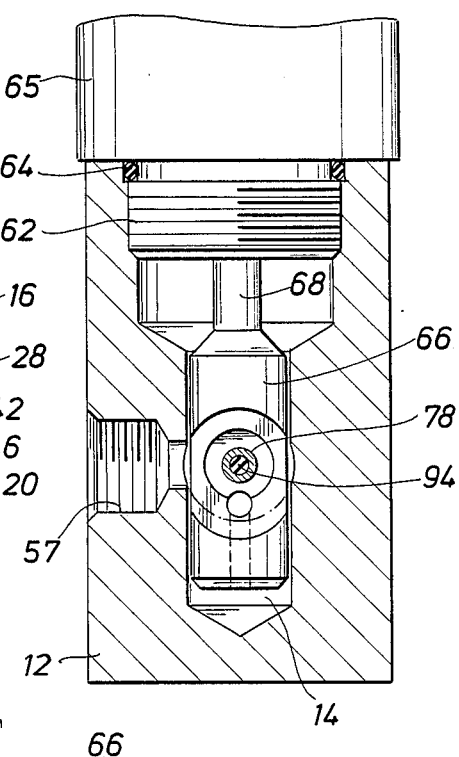

The valve body also defines a "function" port 57 shown in FIG. 3 which communicates the valve chamber 14 with the equipment that is controlled by the valve.

The valve body 12 defines an access opening 58 which is shown at the upper portion of the valve body in FIG. 1. Within the access opening, the valve body defines an internally threaded section 60 which is adapted to receive the externally threaded section of a suitable closure 62. A circular sealing element 64 establishes a high pressure seal between the valve body and the closure. The closure 62 will typically be a component part of a valve actuator such as an electrically energized solenoid valve actuator 65.

The valve mechanism incorporates a seal carrier 66 which is disposed for reciprocation within the valve chamber and which incorporates an elongate valve stem 68 having an upper threaded extremity 70 to which the valve actuator mechanism is operatively interconnected. Interconnection of the valve stem with the valve actuator mechanism may also be accomplished in part by a roll pin 72 which is typically positioned to prevent the valve actuator mechanism from becoming inadvertently unthreaded from the stem member 68.

An intermediate portion 74 of the seal carrier 66 is of reduced dimension and is interposed between the spaced seal surfaces 54 and 56 of the seal plates. This intermediate portion defines a centrally located wall or flange 76 of further reduced dimension, which flange forms a circular, centrally located opening 77. As shown in greater detail in FIG. 2, a seal cylinder 78 having an axial length less than the spacing of the sealing surfaces 54 and 56 is positioned within the circular opening 77 and is capable of rocking motion relative to the flange 76. This rocking motion allows the seal cylinder 78 to seek optimum sealing relation with the planar sealing surface 54 of the supply seal plate 20. The seal cylinder further defines a transversely disposed axial passage or opening 80 extending completely therethrough and having a reduced diameter portion defining a small internal shoulder 82. The seal cylinder also forms an axial projection 84 encompassing the axial passage 80 and defining a circular sealing surface of minimal dimension which maintains sealing engagement with the planar surface 54 of the seal plate 20 as the seal cylinder reciprocates within the valve chamber. The seal plate and the seal cylinder are typically composed of suitable metals and therefore sealing between the axial extension 84 and the sealing surface 54 is properly described as a metal-to-metal seal. This type of seal is utilized in many cases for maintaining effective, long wearing seals for high pressure service application.

The axial passage 80 includes an elongate cylindrical portion which receives a cylindrical seal rod 86 in movable relation therein. The seal rod 86 forms a circular sealing surface 88 at its outer extremity which is disposed in sealing engagement with the planar sealing surface 56 of the vent seal plate 22. A seal plug 90 is positioned within the axial passage 80 with its movement toward the supply side of the valve being restricted by the internal annular shoulder 82. The space within the axial passage 80, between the inner end of the seal rod 86 and the seal plug 90 defines a cylindrical packing chamber 92. Within the packing chamber 92 is disposed a generally cylindrical packing 94 composed of any suitable elastomeric sealing material. The packing member 94 is cut away along its outer periphery from the end thereof facing the supply side of the valve to a point slightly spaced from the opposite end thereof. Cutting away the packing member in this manner insures that a seal is developed between the packing member and the interior surface of the axial passage 80 only at a location adjacent the inner end of the seal rod 86. This features provides a simple and effective seal within the axial passage 80 and eliminates the need for a conventional O-ring packing to accomplish sealing between the seal rod and the seal cylinder. This feature also eliminates the need for close tolerance packing glands that are typically needed in valves of this general character.

As the seal carrier 66 is reciprocated by electrical energization of a solenoid actuator or by any other suitable means, the seal cylinder 78 is moved linearly within the space between the opposed sealing surfaces 54 and 56 and is capable of rockable motion relative to its mounting flange 76 such that the seal cylinder and the seal rod assume optimum sealing positions relative to the planar sealing surfaces of the valve. This rockable alignment motion is similar to that set forth in U.S. Pat. Nos. 3,917,220 and 4,493,335.

The seal cylinder is capable of assuming two operative positions, i.e., a supply position and a vent position. In the supply position the seal cylinder 78 is positioned above the FIG. 2 position thereof such that the sealing end 88 of the seal rod 86 is in blocking relation with the vent port 52. In this position the axial extension 84 of the seal cylinder has moved upwardly, clearly the supply port 50 and thus communicating the supply of flid pressure from the source into the valve chamber and thence through the function port 57 to the apparatus being controlled by the valve. In this position stop shoulders 100 and 102 of the seal carrier 66 will engage the lower portions of the seal plates 20 and 22 thus restraining further upward movement of the seal carrier.

Figure 2:
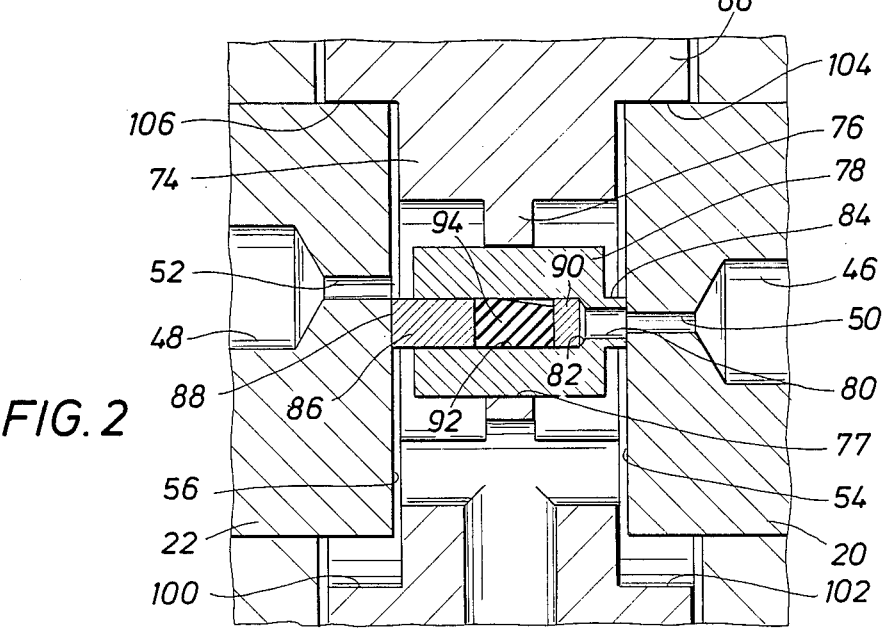

In the second position, the vent position shown in FIGS. 1 and 2, the seal carrier 66 will be positioned as shown in FIG. 2 with upper stop shoulders 104 and 106 disposed in restraining engagement with the seal plates 20 and 22 as shown. The seal rod 86 is positioned out of blocking relation with the vent port 52 and thus the vent port is in communication via the valve chamber with the function port 57 to thereby permit venting of fluid pressure from the equipment being controlled via the vent port. In this position fluid pressure from the supply port 50 is in communication via the axial passage 80 with the packing chamber 92. The circular sealing surface defining the end surface of the axial extension 84 prevents fluid pressure of the supply from entering the valve chamber 14. Since the seal plug 90 does not establish a seal within the axial passage 80, fluid pressure bypasses the seal plug and acts upon the packing member 94 for establishment of a seal within the seal cylinder. Since the packing member 94 is cut away along most of its length, a seal is established between the packing member and the inner wall surface defining the axial passage 80 only at a location immediately adjacent the inner end of the seal rod. In addition to providing a seal internally of the seal cylinder, the fluid pressure communicated through axial passage 80 propagates through the packing member and is applied to the inner surface area of the seal rod. Thus, the seal rod is urged outwardly by fluid pressure being transmitted through the packing member 94 which causes the outer sealing surface 88 of the seal rod to be maintained in efficient sealing engagement with the planar sealing surface 56. Pressure actuation of the seal rod in this manner also causes the seal cylinder 78 to be urged in the opposite direction, i.e., toward the supply port 50, thereby causing the small circular sealing surface of the axial extension 84 to be maintained in efficient sealing contact with the planar sealing surface 54. The capability of the seal cylinder to move relative to its support flange 76, the capability of the seal rod to move relative to the seal cylinder and the capability of the seal cylinder and seal rod to rock to a limited extent within the valve chamber as it is reciprocated between the supply and vent positions effectively permits the seal cylinder and seal rod to maintain efficient sealing engagement with the sealing surfaces 54 and 56 at all times. Friction during such movement is minimized by the exceptionally small dimension of the sealing surfaces of the seal cylinder and seal rod and also because an efficient seal is developed within the seal cylinder without the necessity of providing close tolerance packings or O-rings.

In view of the foregoing it is respectfully submitted that a high pressure low friction shear valve mechanism has been provided herewith which clearly accomplishes all of the features and objects hereinabove set forth together with other features which are inherent in the valve mechanism itself. It will be understood that certain combinations and subcombinations of this invention are of utility and may be employed without reference to other features and subcombinations. This is contemplated by and is within the scope of the present invention.

What is claimed is

1. A high pressure, low friction slide valve mechanism, comprising:
    (a) a valve body forming a valve chamber and having spaced parallel sealing surface defined within said valve chamber, said valve body further defining flow passages in communication with said valve chamber;
    (b) a seal carrier being in linearly movable relation with said valve body and having a portion thereof being linearly movable within said valve chamber;
    (c) a seal cylinder being supported for rockable movement by said seal carrier and forming a transverse passage extending therethrough and having a sealing portion at one end thereof being disposed in sealing engagement with one of said sealing surfaces and located for registry with one of said flow passages;
    (d) a seal rod being supported within said transverse passage and having an end surface thereof disposed in sealing engagement with the other of said sealing surfaces and located for registry with another of said flow passages; and
    (e) a seal packing being located within said transverse passage and having engagement with the opposite end of said seal rod, said seal packing establishing a seal within transverse passage and transmitting pressure induced force to said opposite end of said seal rod.

2. The slide valve mechanism of claim 1, wherein: said seal packing is constructed to establish a seal against the inner wall surface of said seal cylinder immediately adjacent said opposite wall of said seal rod.

3. The slide valve mechanism of claim 2, wherein: said seal packing is defined by a generally cylindrical body of elastomeric material with an outer peripheral portion thereof cut away along a major portion of the length thereof.

4. The slide valve mechanism of claim 1, wherein: said seal packing is composed of a body of elastomeric material of generally cylindrical configuration and having one end of cylindrical cross-sectional configuration disposed in abutment with said seal rod, said seal packing being cut away along its outer periphery from said one end to the opposite end thereof.

5. The slide valve mechanism of claim 4, wherein:
(a) said transverse passage of said seal cylinder forms an internal shoulder; and
(b) a seal plug is positioned within said transverse shoulder and is interposed between said seal packing and said internal shoulder.

6. The slide valve mechanism of claim 1, wherein:
(a) said seal carrier defines a radially inwardly projecting flange forming and opening therein; and
(b) said seal cylinder being movably positioned within said opening of said radially inwardly projecting flange and thus permitting said seal cylinder to have rockable motion relative to said seal carrier thereby permitting said seal cylinder and said seal rod to efficiently maintain sealing contact with both of said spaced parallel sealing surfaces during linear movement thereof within said valve chamber.

7. The slide valve mechanism of claim 1, wherein: said seal cylinder forms an axial projection having said transverse passage extending therethrough and forming a circular sealing surface at the free end thereof having sealing engagement with said one of said spaced parallel sealing surfaces.

8. The slide valve mechanism of claim 7, wherein: said seal rod is of cylindrical configuration and is received in movable relation within said transverse passage, said seal rod forming a circular sealing surface disposed in sealing engagement with said other of said spaced parallel sealing surfaces.

9. The slide valve mechanism of claim 1, wherein: said flow passages of said valve body define an inlet port and a vent port intersecting respective ones of said spaced parallel sealing surfaces, said inlet port and said vent port being disposed in misaligned relation such that when said seal cylinder is positioned to block one of said inlet and vent ports the other of said ports is in communication with said valve chamber, said valve body further forming a function port for communication of fluid pressure to or form remote apparatus being controlled by the valve mechanism.

10. The slide valve mechanism of claim 9, wherein:
(a) said seal cylinder forms an axial projection extending toward said supply port and forming a circular sealing surface having sealing engagement with said one of said spaced parallel sealing surfaces, said transverse passage extending through said axial projection; and
(b) said seal rod being of cylindrical form and having a portion thereof projection from said transverse passage and extending toward said vent port and defining a circular sealing surface disposed in sealing engagement with said other of said spaced parallel sealing surfaces, and said circular sealing surface of said axial projection being disposed to encompass said inlet port and thus permit fluid pressure from said inlet port to enter said transverse passage and act upon said seal packing for development of a pressure induced seal within said transverse passage of said seal cylinder.

11. The slide valve mechanism of claim 10, wherein: said seal cylinder and said seal rod are composed of metal, thus establishing a metal-to-metal seal with said spaced parallel sealing surfaces of said valve body.

12. The slide valve mechanism of claim 10, wherein: said valve body and said seal carrier cooperate to define spaced internal stop means limiting linear movement of said seal carrier in each direction of its movement, said stop means positioning said seal cylinder for selected sealing of said inlet port and said vent port.

13. The slide valve mechanism of claim 1, wherein:
(a) said valve body forms opposed seal plate receptacles; and
(b) a pair of seal plates are located within said seal plate receptacles and form said opposed planar sealing surfaces, said seal plates also forming two of said flow passages.

14. The slide valve mechanism of claim 13, wherein: one of said seal plates forms an inlet one of said flow passages and the other of said seal plates forms a vent one of said flow passages.

15. A high pressure, low friction slide valve mechanism, comprising:
(a) valve body means forming a valve chamber and having supply, vent and function passages in communication with said valve chamber, said valve body means further defining seal plate receptacle means;
(b) a pair of seal plates being received in sealed relation by said seal plate receptacle means and having planar sealing surfaces disposed in spaced parallel relation;
(c) a seal carrier being movably disposed within said valve body means and having a portion thereof positioned for reciprocatory movement between said planar sealing surfaces;
(d) means for imparting reciprocatory movement to said seal carrier;
(e) a seal cylinder being supported for rockable movement by said seal carrier and having a passage extending therethrough forming a packing chamber therein, said seal cylinder also forming a sealing surface about said passage which is disposed in sealing engagement with one of said planar sealing surfaces;
(f) a seal rod extending into said passage of said seal cylinder and having a planar end portion thereof disposed in sealing engagement with the other of said planar sealing surfaces; and
(g) a seal packing composed of elastomeric material being disposed within said packing chamber with one end thereof in engagement with said seal rod, said seal packing being configured to establish a seal within said passage at a location immediately adjacent said seal rod.

16. The slide valve mechanism of claim 15, including: a seal plug being positioned within said seal chamber and retaining said packing within said seal packing within said packing chamber.

17. The slide valve mechanism of claim 15, wherein: said seal packing is composed of a body of elastomeric material of generally cylindrical configuration and having one end of cylindrical cross-sectional configuration disposed in abutment with said seal rod, said seal packing being cut away along its outer periphery from said one end to the opposite end thereof.

18. The slide valve mechanism of claim 15, wherein:
(a) said seal carrier defines a radially inwardly projecting flange forming and opening therein; and
(b) said seal cylinder being movably positioned within said opening of said radially inwardly projecting flange and thus permitting said seal cylinder to have rockable motion relative to said seal carrier thereby permitting said seal cylinder and said seal rod to efficiently maintain sealing contact with both of said spaced parallel sealing surfaces during linear movement thereof within said valve chamber.

19. The slide valve mechanism of claim 15, wherein:
(a) said seal cylinder forms an axial projection having said transverse passage extending therethrough and forming a circular sealing surface at the free end thereof having sealing engagement with said one of said spaced parallel sealing surfaces; and
(b) said seal rod is of cylindrical configuration and is received in movable relation within said transverse passage, said seal rod forming a circular sealing surface disposed in sealing engagement with said other of said spaced parallel sealing surfaces.

20. The slide valve mechanism of claim 15, wherein
(a) said seal cylinder forms an axial projection extending toward said supply port and forming a circular sealing surface having sealing engagement with said one of said spaced parallel sealing surfaces, said transverse passage extending through said axial projection; and
(b) said seal rod being of cylindrical form and having a portion thereof projecting from said transverse passage and extending toward said vent port and defining a circular sealing surface disposed in sealing engagement with said other of said spaced parallel sealing surfaces, and said circular sealing surface of said axial projection being disposed to encompass said inlet port and thus permit fluid pressure from said inlet port to enter said transverse passage and act upon said seal packing for development of a pressure induced seal within said transverse passage of said seal cylinder.

* * * * *